US006453467B2

(12) United States Patent
Madany et al.

(10) Patent No.: US 6,453,467 B2
(45) Date of Patent: *Sep. 17, 2002

(54) METHODS AND APPARATUS FOR LINKING A PROGRAM FOR REMOTE EXECUTION

(75) Inventors: Peter W. Madany, Fremont, CA (US); Richard Tuck, San Francisco, CA (US); Nedim Fresko, San Francisco, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/726,609

(22) Filed: Dec. 1, 2000

Related U.S. Application Data

(63) Continuation of application No. 09/044,904, filed on Mar. 20, 1998.

(51) Int. Cl.[7] .................................................. G06F 9/44
(52) U.S. Cl. ........................................ 717/165; 717/167
(58) Field of Search ........................... 717/1–3, 10, 11, 717/5, 100, 108, 165, 166, 167, 176, 177, 178; 709/331, 332, 216–223; 707/103

(56) References Cited

U.S. PATENT DOCUMENTS

| 5,519,866 A | * | 5/1996 | Lawrence et al. | ........... 395/710 |
| 5,553,290 A | * | 9/1996 | Calvert et al. | ............... 395/703 |
| 5,590,331 A | * | 12/1996 | Lewis et al. | ................. 395/708 |
| 5,727,147 A | * | 3/1998 | Hoff | ............................ 709/200 |
| 5,790,796 A | * | 8/1998 | Sadowsky | .................... 709/221 |
| 5,802,514 A | * | 9/1998 | Huber | |
| 5,862,346 A | * | 1/1999 | Kley et al. | ................... 709/245 |
| 5,966,702 A | * | 10/1999 | Fresko et al. | ................... 707/1 |
| 6,199,196 B1 | * | 3/2001 | Madany et al. | ................. 717/2 |

OTHER PUBLICATIONS

Lentczner, "Java's Virtual World: Java Components incluse High–level language and Virtual Machine", Microprocessor Report, Oct. 1996, vol. 10, No. 4.*
Coffee, "Speaking Native Language: IBM's HPJ beta performs speedy compilation but has its limits" PC Week, Jun. 1997, pp 46.*
Leopold, "Object–Oriented Programming in Ada", IEEE, 1989, pp 549–552.*
Hibbard, "Microsoft, Sun add Java to Web servers", Computerworld, Dec. 16, 1996, p. 12.*

* cited by examiner

*Primary Examiner*—Kakali Chaki
(74) *Attorney, Agent, or Firm*—Finnegan, Henderson, Farabow, Garrett & Dunner, L.L.P.

(57) ABSTRACT

A linkage editor executing at a server receives instructions for packaging software components that are required for program execution at a client. The linkage editor generates an output file by iteratively analyzing the program for references to other software components and extracting those components from their parent classes. The linkage editor sends the completed output file to an interface task, which transmits it to the client.

25 Claims, 8 Drawing Sheets

METHODS AND APPARATUS FOR LINKING A PROGRAM FOR REMOTE EXECUTION

RELATED APPLICATIONS

This is a continuation of application Ser. No. 09/044,904, filed Mar. 20, 1998 which is incorporated herein by reference.

The following U.S. patent application is relied upon and is incorporated by reference in this application: U.S. patent application Ser. No. 09/044,900, entitled "Methods and Apparatus for Packaging a Program for Remote Execution," and filed on the same date herewith.

BACKGROUND OF THE INVENTION

A. Field of the Invention

Embodiments of the invention generally relate to distributed computer systems and, more particularly, to methods and apparatus for packaging a computer program for remote execution.

B. Description of the Related Art

In today's society, the Internet has become an important medium for information exchange. Although the Internet is now very popular among the general public, it initially began as a system (or network) of interconnected computers used by government and academic researchers. An early problem of this network stemmed from the fact that the interconnected computers were not the same; they employed different hardware as well as different operating systems. Information exchange on such a heterogeneous network posed a communication problem. This problem was resolved through agreement on common standards, including protocols such as Transmission Control Protocol/Internet Protocol (TCP/IP) and HyperText Transfer Protocol (HTTP). These protocols enabled varied interconnected machines to share information in the form of static text or graphic documents.

These protocols, however, represented only two steps in the evolution of the Internet. Although users can exchange information documents among varied computers connected to the Internet, they cannot exchange executable application programs written in conventional languages such as C or C++, which are designed to interface with a particular processor (e.g., the Intel Pentium processor) and/or a particular operating system (e.g., Windows 95 or DOS). This problem was solved with the advent of the Java™ programming language and its related runtime system.

The Java programming language is an object-oriented programming language that is described, for example, in a text entitled "The Java™ Tutorial" by Mary Campione and Kathy Walrath, Addison-Wesley, 1996.[1] Importantly, the Java programming language is an interpreted language that is platform-independent—that is, its utility is not limited to one particular computer system. Using the Java programming language, a software developer writes programs in a form commonly called Java source code. When the developer completes authoring the program, he then compiles it with a Java compiler into an intermediate form called bytecode. Both the Java source code and the bytecode are platform-independent. L6 Sun, Sun Microsystems, the Sun Logo, Java, the Java Virtual Machine, and the Java Runtime Environment are trademarks or registered trademarks of Sun Microsystems, Inc. in the United States and other countries.

The compiled bytecode can then be executed on any computer system that employs a compatible runtime system that includes a virtual machine (VM), such as the Java Runtime Environment (JRE) that includes the Java Virtual Machine (JVM) and Java class libraries. The JVM is described in a text entitled "The Java Virtual Machine Specification," by Tim Lindholm and Frank Yellin, Addison Wesley, 1996. The Java VM acts as an interpreter between the bytecode and the particular computer system being used. By use of platform-independent bytecode and the Java VM, a program written in the Java programming language can be executed on any computer system. This is particularly useful in networks such as the Internet that interconnect heterogeneous computer systems.

Before a Java program can be executed, certain requisite classes must be loaded into the memory of the computer executing the program. These classes may be loaded from the computer's disk, but are more commonly transferred across a network from a server. Customarily, these classes are loaded as late during the program's execution as possible; in other words, they are loaded on-demand, when first referenced during the program's execution. When such loading occurs, it is also customary to load an entire class whenever any part of that class is necessary.

According to a conventional approach, when a user on a machine issues a request to execute the program resident on a remote server, the class file containing the main method is loaded from the server to the client across the network. This class file contains the program bytecode. The virtual machine then begins execution by invoking the main method of the program.

Execution continues until the program references a component, for example a component referred to as "F." In response to this reference, the entire class that contains component F is transferred from class files on the server to the client via the network. The referenced component F is used and execution then continues until another component, for example a component referred to as "G," is referenced. In response to this reference, the entire class containing component G is transferred from class files on the server to the client via the network. Execution then continues to completion. Once the execution has completed, the series of connections between the client and the server over the network may finally be terminated.

This description demonstrates two significant disadvantages with the conventional approach. First, it requires repeated connections between the client and the server throughout the course of program execution. Such a lengthy period during which connections must be made may be problematic for situations such as mobile computing. Second, whenever a component is referenced, for example, component F, this approach requires that the entire class containing that referenced component be loaded from the server. If, however, only a few of the components within the class are ultimately used, the bandwidth required to transfer the unused components from the server to the client has been wasted. This is problematic in situations involving limited bandwidth, i.e., slow connection speeds or high-latency connections, between the client and the server.

There is therefore a need for a system that alleviates these problems by packaging together only the necessary components of an entire program and delivering it to the client before execution begins. Prepackaging software for remote execution has been employed using other compiled computer languages requiring machine compatibility, such as Cobol, C and Fortran. It has not, however, been employed using an object-oriented languages, such as the Java programming language, which provide additional benefits, such as extracting necessary components from their parent classes.

SUMMARY OF THE INVENTION

In accordance with the present invention, a method for packaging a program component for execution in a distributed system comprises the steps of determining a component referenced by a program, extracting the component from a stored class, and generating a package that includes the program and the extracted component.

In accordance with the present invention, a computer-readable medium contains instructions for packaging a program component for execution in a distributed system by determining a component referenced by a program, extracting the component from a stored class, and generating a package that includes the program and the extracted component.

In accordance with the present invention, an apparatus for packaging a program component for execution in a distributed system comprises means for determining a component referenced by a program, means for extracting the component from a stored class, and means for generating a package that includes the program and the extracted component.

In accordance with the present invention, a system comprises a client, a server, and a network. The client has a processor, a memory, and a runtime environment including a virtual machine task. The server has a processor, a memory, an interface task, a linkage editor task, and a component file. The network interconnects the client and the server.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

DETAILED DESCRIPTION

Figure 1:
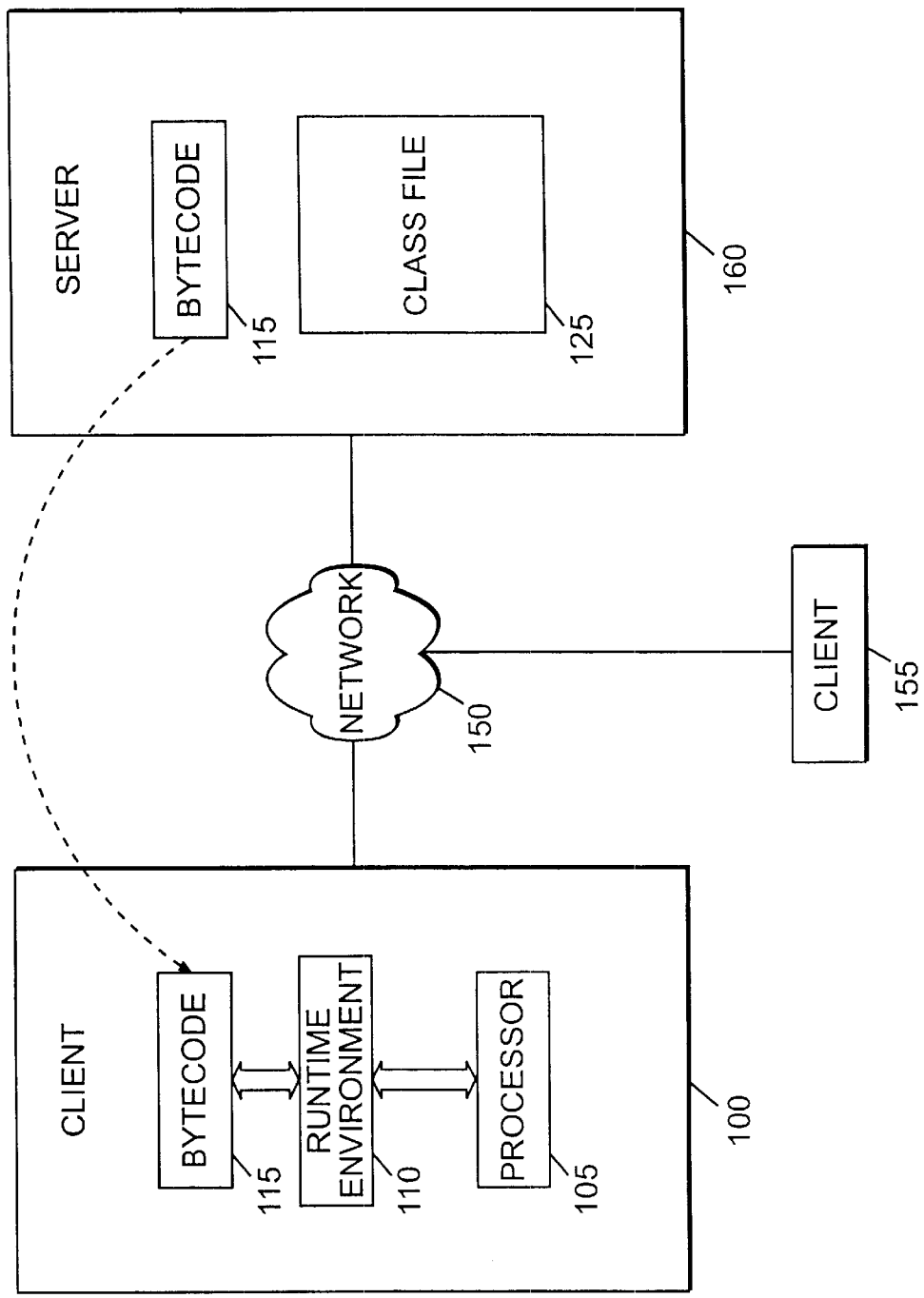
FIG. 1 is a block diagram of a typical client-server configuration used to explain remote program execution using a runtime environment that includes a virtual machine.

Reference will now be made in detail to an implementation of the present invention as illustrated in the accompanying drawings. Wherever possible, the same reference numbers will be used throughout the drawings and the following description to refer to the same or like parts.

A. Overview

Systems and methods consistent with the present invention operate in a distributed computer system, typically having multiple clients and one or more servers. As one example, a client seeking to execute a program requests a server to package together the software needed to run the program. In formulating this request, the client may specify certain components that should be included in the package.

A task executing at the server (the "interface task") receives this request, and determines the software components that already reside at the client machine. The interface task uses this information to formulate a set of instructions to another task called the linkage editor. These instructions may include: the name of the program to be executed, the components that need not be packaged because they already reside at the client machine, and the names of any software components that the client machine may have specified to include in the package.

The linkage editor receives this information and generates an output file that contains all software components that reside at the server and are necessary for program execution. This output file is generated by iteratively analyzing the program for references to other software components and extracting those components from their parent classes. The linkage editor sends the completed output file to the interface task, which transmits it to the client that requested it, and program execution begins.

B. Terminology

For the sake of explanation, the detailed description below is based upon the Java programming language. For that reason, there follows a brief section defining terminology as used hereinafter. One of skill in the art, however, will recognize that the same principles explained below apply to other programming languages.

A Java application program consists of one or more class definitions, each of which has been compiled into its own class file that contains bytecode and other information. A "class," in turn, is a collection of data ("fields"), "methods" that operate on the data, and ancillary information. The ancillary information may include, for example, shared data structures, names of superclasses, and interfaces implemented. As used herein, the term "component" refers to either a method or a field or both. An "object" is something created by using the blueprint provided by a class, i.e., it is an "instance" of the class. A Java application program must contain one class that defines the main method, which represents the point at which the Java interpreter starts executing the program. Such an application program may be executed by the Java interpreter, i.e. the Java VM.

In contrast to a stand-alone application program, a Java applet does not contain a main method, and consequently cannot be executed directly by the Java interpreter. Instead, a Java applet is a class that is loaded by an already executing Java application such as a Web browser. The Java application invokes the various methods of the applet at the appropriate times.

As used herein, the term "program," when used alone, may refer to either an application program, a Java applet, a process, or other software code. The term "task" may refer to a program executing on a computer processor. The term "package" may include components, ancillary information, or other data required for program execution.

For the sake of simplicity, the examples contained herein assume that an application program is being executed. Those of skill in the art, however, will recognize that the claimed invention may encompass execution of an applet and other software code.

C. Architecture

FIG. 1 shows the use of the Java programming language in a distributed computing system. The system consists of one or more servers such as server 160 and one or more clients, such as clients 100 and 155, interconnected by a network 150. The software developer creates a program using the Java programming language and compiles it into bytecode 115 that is stored on server 160. Typically, server 160 also contains numerous class files 125 that are employed by Java 110 programs. When a client 100 wishes to execute a Java program, it issues a request to server 160. In response, server 160 transmits the bytecode version of program 115 to client 100. At client 100, bytecode 115 executes on a runtime environment 110, which interprets between bytecode 115 and a processor residing on client 100.

Figure 2:
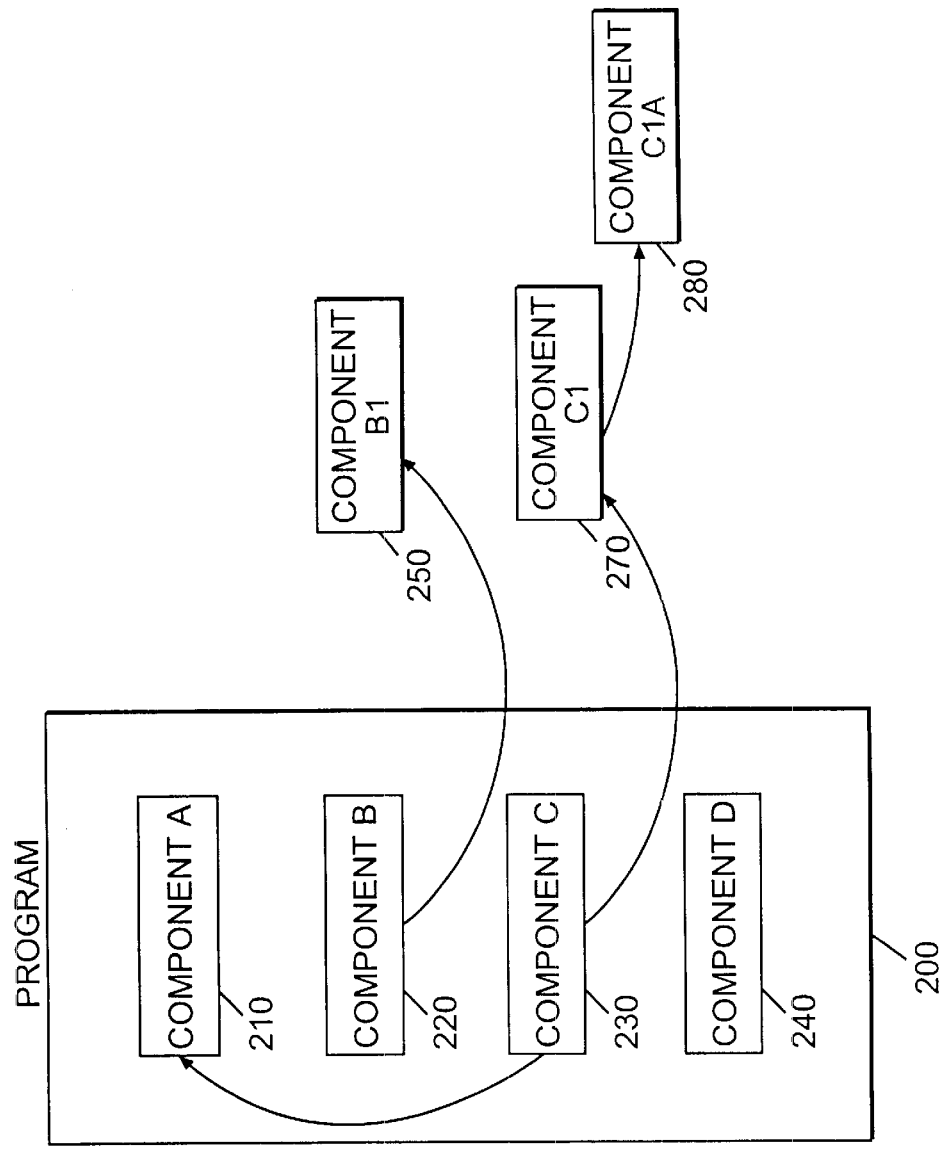
FIG. 2 is a block diagram depicting a typical executable object-oriented program along with its referenced components and their dependencies.

FIG. 2 is an exemplary block diagram showing component references within a typical is executable program. In this example, a program 200 references four components, shown here as component A 210, component B 220, component C 230, and component D 240. These referenced components, in turn, reference other components. For example, component B 220 references component B1 250. Similarly, component C 230 references component A 210 and component C1 270. In turn, component C1 270 references component C1A 280. Such a reference by one component of another component is commonly referred to as a dependency. Each referenced component must be loaded because it may be used during program execution.

D. Timeline

Figure 3:
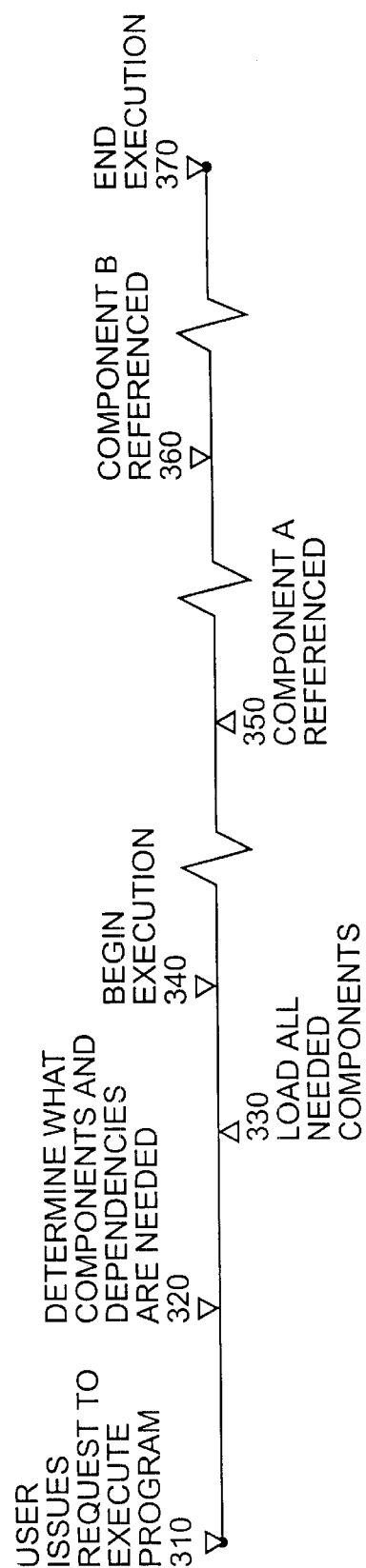
FIG. 3 is a timeline used to explain the timing of linking and execution consistent with the present invention.

FIG. 3 is a timeline used to explain the timing of linking and execution consistent with the present invention. The process begins when a user issues a request to execute a program (point 310) on client 100. In response, server 160 determines what components and dependencies are needed for the program to execute (point 320). Each of these needed components, along with ancillary class information, is then transferred from server 160 to client 100 via network 150 (point 330). At this point, all components and classes required for program execution have been transferred from server 160 to client 100 and, therefore, the connection between the two may be terminated.

Program execution then begins (point 340), and component A 210 is referenced (point 350). Because that component has already been loaded onto client 100 (at point 330), however, there need be no separate transfer of that component from server 160 to client 100. Similarly, when component B 220 is referenced (point 360), it need not be transferred because it has already been transferred from server 160 to client 100. Execution therefore proceeds to completion (point 370) uninterrupted.

FIG. 3 demonstrates that a process consistent with the present invention requires client 100 to remain connected to server 160 only until program loading ends (from point 300 to point 330). Once the necessary components and ancillary class information have been loaded (at point 330), client 100 may disconnect from server 160. Then, for the entire duration of program execution (point 340 to point 370), client 100 and server 160 need not be connected. Moreover, server 160 only transfers to client 100 those components and the ancillary class information that are essential to program execution (point 330). By eliminating the transfer of unused components, bandwidth is used more efficiently.

E. Architecture of Interface Task and Linkage Editor

Figure 4:
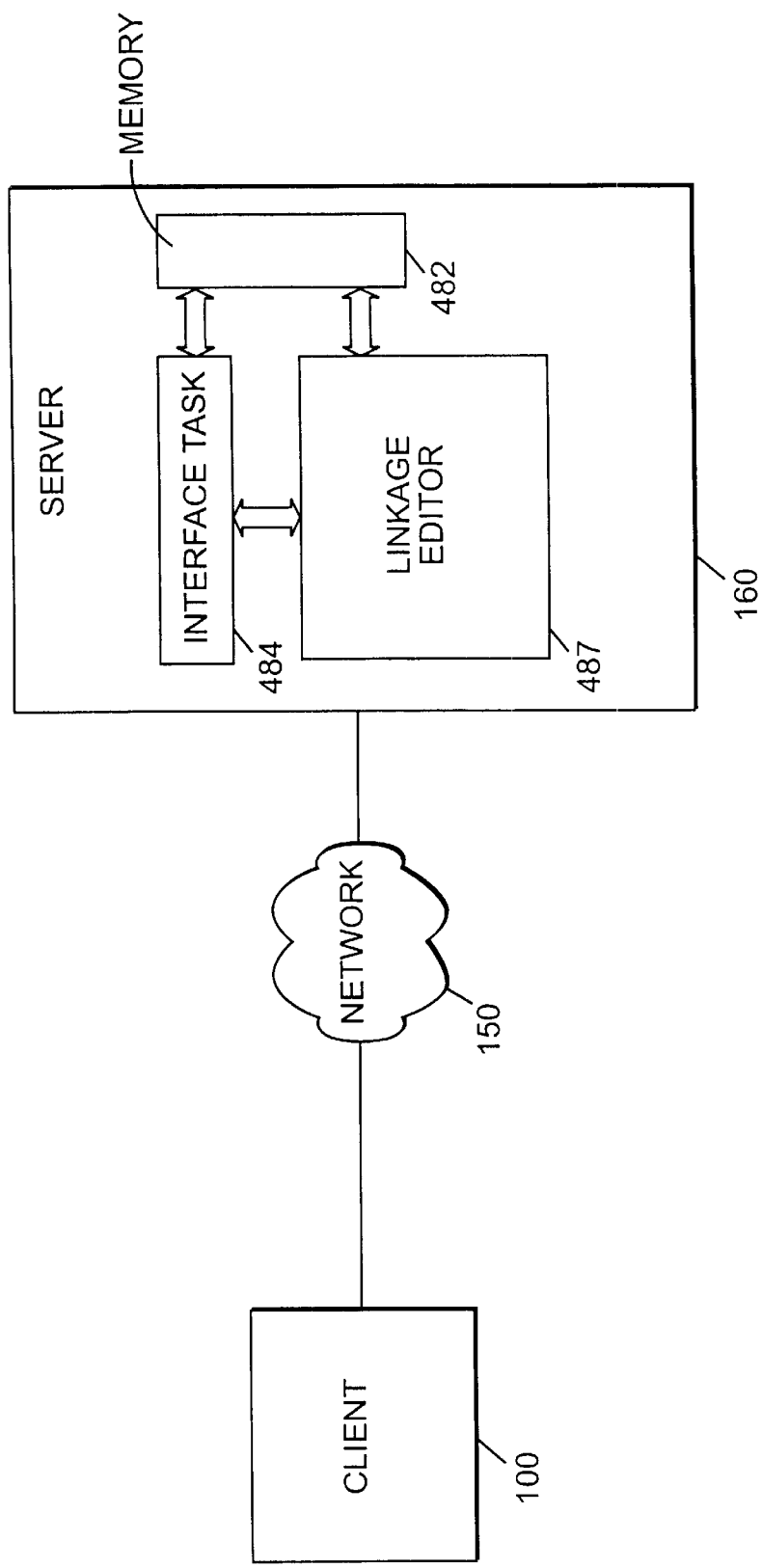
FIG. 4 is a block diagram depicting typical interface and linkage editor tasks in relation to a server and a client.

FIG. 4 is a block diagram depicting an interface task and a linkage editor in relation to a server and a client. Client 100 is interconnected to server 160 via network 150. Server 160 contains a memory 482, which may contain Java class files. Examples of memory 482 include random access memory (RAM), read only memory (ROM), a hard disk drive, or a compact disc based ROM (CD-ROM). Executing on server 160 are two tasks: an interface task 484, and a linkage editor, 487. A request is issued to server 160 to package the necessary Java code to execute a program on client 100. At server 160, this request is received by interface task 484. Interface task 484, in turn, formulates a set of packaging instructions and sends them to linkage editor 487. Linkage editor 487 creates a package containing any components necessary for execution that reside on server 160, and sends the package to interface task 484. Interface task 484 receives this package and sends it to client 100, which uses the package to execute the program.

F. Interface Task

Figure 5:
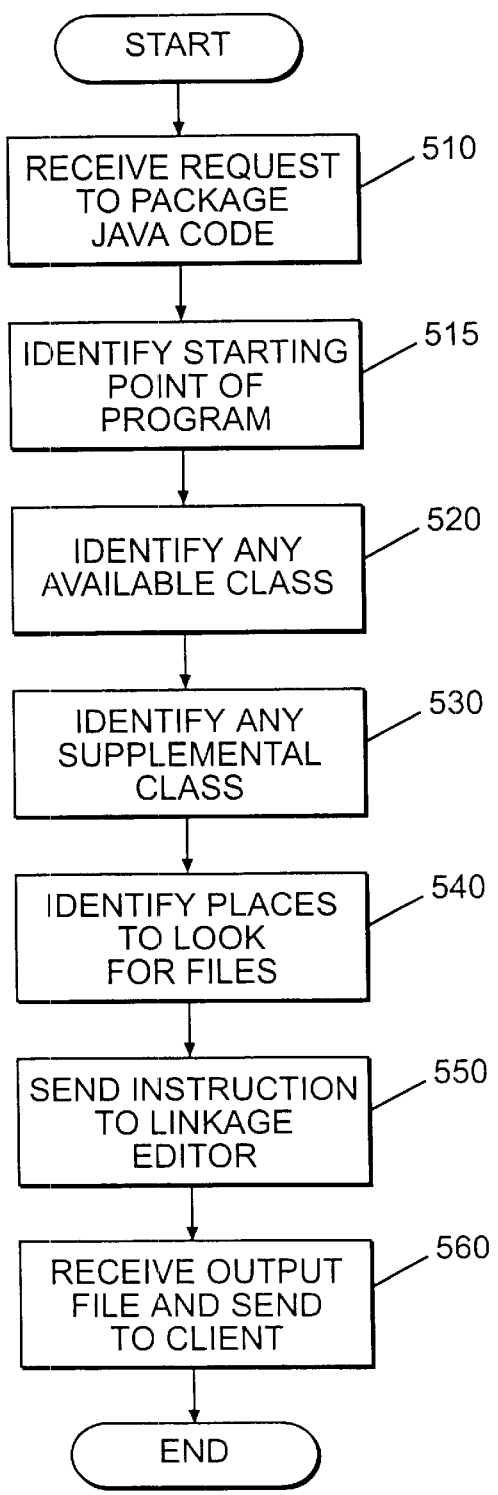
FIG. 5 is a flow diagram of the steps performed by an interface task in a packaging process consistent with the present invention.

FIG. 5 is a flow diagram of the steps performed by an interface task in a packaging process consistent with the present invention. At the beginning of the process, interface task 484 (executing on server 160) receives a request to package a Java program for execution on a named client, for example client 100 (step 510). The Java program is typically specified as a collection of Java classes and components. The location of some class files is predefined. The location of other, necessary classes is included in the request to package the Java program.

In response to this request, interface task 484 formulates a set of instructions for a linkage editor. As part of these instructions, the interface task notifies linkage editor 487 of the starting point of the program (step 515). This gives linkage editor 487 a starting point for determining which components are needed.

Interface task 484 also notifies linkage editor 487 of any class that is already present on client 100 (step 520). By providing this information, the interface task avoids unnecessary packaging: linkage editor 487 need not package components that already exist on client 100. This conserves bandwidth usage by minimizing the size of the output file. This information may be provided to the interface task as part of the request to package components (step 510). Alternatively, this information may be stored within memory 482 of server 160, from having been previously provided. For this step to operate correctly, the classes already present on client 100 must be consistent with those on server 160.

Interface task 484 also notifies linkage editor 487 of any supplemental component that should be added to the program package (step 530). This may be necessary for example, if a component has been excluded from the linkage step because the class containing that component already exists on client 100; that excluded component, however, may reference other components that are not available on client 100, and therefore may be need to be added to the package by linkage editor 487. In addition to components that are excluded because their class already exists on client 100, there may also be some dependencies that cannot be discovered programmatically. Interface task 484 typically is informed (at step 510) of any supplemental components as part of the request to package components.

For example, the method quicksort may be excluded from the linkage step because the class containing that method, sun.misc.Sort, is already loaded on client 100. When the method quicksort is invoked, one of its parameters is an object having the method doCompare. Quicksort will invoke doCompare, which may not already be loaded on client 100.

Accordingly, interface task 484 must notify linkage editor 487 that the method doCompare must be loaded as a supplemental component.

Interface task 484 also notifies linkage editor 487 of a list of places to look for the required Java class files (step 540). Interface task 484 sends these instructions to linkage editor 487 (step 550), which generates an output file as described below in reference to FIG. 5. Interface task 484 receives the output file and sends it to client 100 (step 560), and the process ends.

G. Linkage Editor

Figure 6:
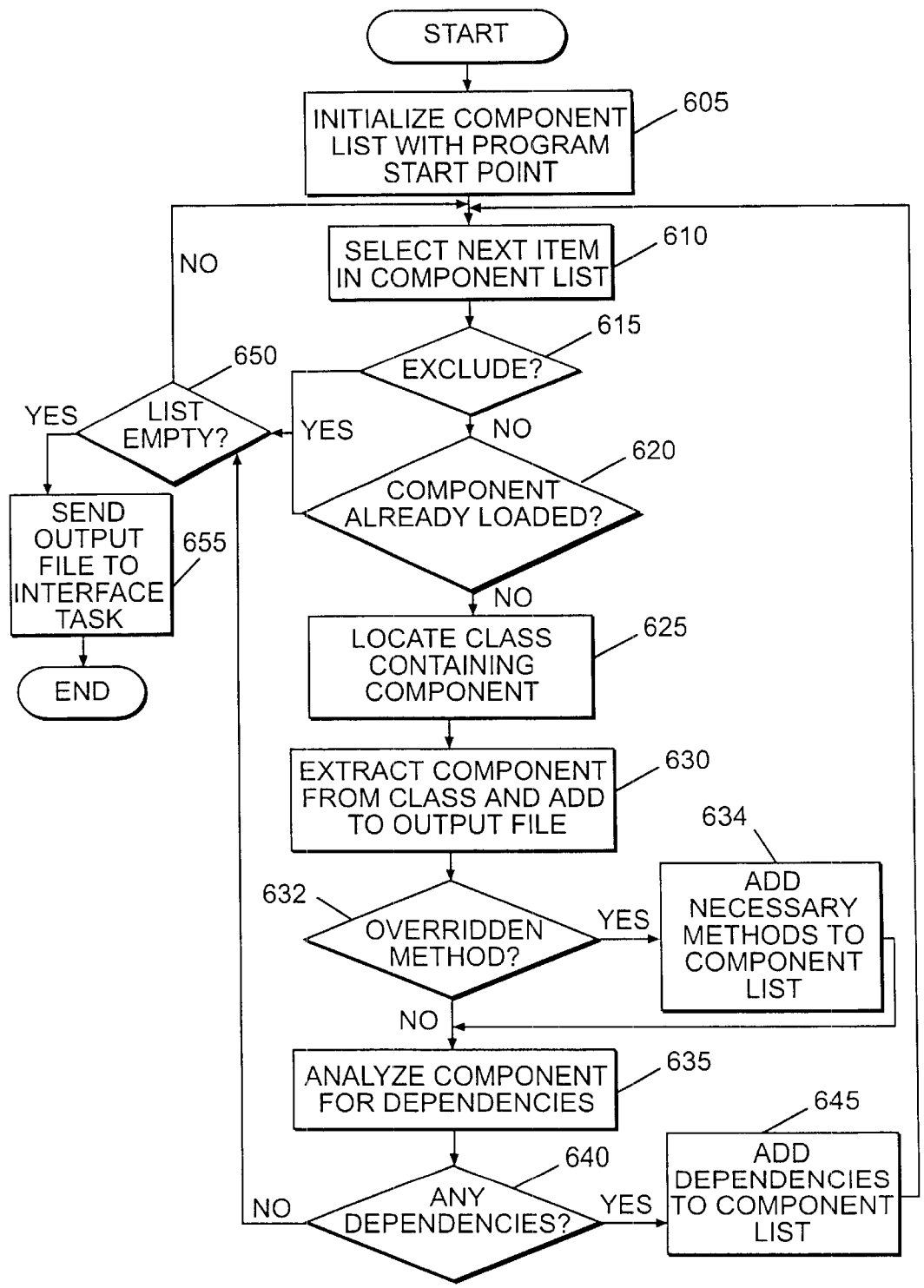
FIG. 6 is a flow diagram of the steps performed by the linkage editor in packaging an output file, in an embodiment consistent with the present invention.

FIG. 6 is a detailed flow diagram, consistent with the present invention, of the steps performed by linkage editor 487 in packaging an output file. For explanatory purposes, the following description of the flow is based upon the example in FIG. 2.

In the beginning of the process, linkage editor 487 (typically executing on server 160) receives a set of instructions from interface task 484. Linkage editor 487 then creates and initializes a list with the starting point of the program to be executed (step 605). This list, referred to as the "component list," contains a reference to each necessary component that must be loaded by linkage editor 487.

Linkage editor 487 then selects the next item in the component list, which initially will be the main method (step 610). Linkage editor 487 checks to see if the selected component is on of items to exclude because, for example, the component is more readily available from another source, such as client 100 or another server. Because the main method will not be on the list of things to exclude, linkage editor 487 checks to determine if the selected component has previously been loaded in the linkage process (step 620). Because the main method will not have been previously loaded, linkage editor 487 then locates the class file that contains the component to be loaded, using the list of file locations provided by the server in its instructions to linkage editor 487 (step 625). Linkage editor 487 reads that class file, extracts any ancillary information associated with that class file, extracts the selected component from the class file, and adds the extracted ancillary information and component to an output file (step 630). Note that by doing so, linkage editor 487 only extracts necessary components and ancillary information, rather than loading the entire class.

After loading the extracted component, linkage editor 487 checks for overridden methods (step 632). This step is further described in reference to FIG. 7, below. Next, linkage editor 487 analyzes the extracted component to determine if it references other components (step 635). In other words, linkage editor 487 analyzes the extracted component for dependencies. In this example, the main method references four components: A, B, C, and D. Because the extracted component (main) contains dependencies (step 640), those dependencies are added to the component list (step 645), and the process repeats (at step 610).

The same process described above with respect to the main method is then followed for components A, B, C, and D. Assuming that component D is contained in a class that interface task 484 instructed linkage editor 487 to exclude from the packaging process (because, for example, it is already available on client 100), component D would be excluded from the output file (step 615). Components A, B, and C, on the other hand, will be extracted from their respective classes (along with ancillary information associated with those classes) and added to the output file (steps 625–630). When those components are extracted and analyzed, linkage editor 487 will discover that component B references component B1, and component C references components A and C1 (step 635). Components B1, A, and C1 will accordingly be added to the component list (step 645), and the process will repeat once again (step 610).

During this next iteration, component A will not be extracted because it has already been added to the output file (step 620). Components B1 and C1, however, will be extracted from their respective classes and added to the output file, along with the ancillary information associated with their classes (steps 625–630). Linkage editor 487 will discover that component C1 references component C1A (step 635), and will add it to the component list (step 645). The process repeats one more time, during which component C1A is extracted from its respective class (along with that class' ancillary information) and added to the output file (steps 625–630).

By using this iterative process, linkage editor 487 creates an output file that contains all components (and ancillary class information) that reside on server 160 and are necessary for executing the program. Linkage editor 487 sends this output file to interface task 484 (step 655), and the process ends.

Figure 7:
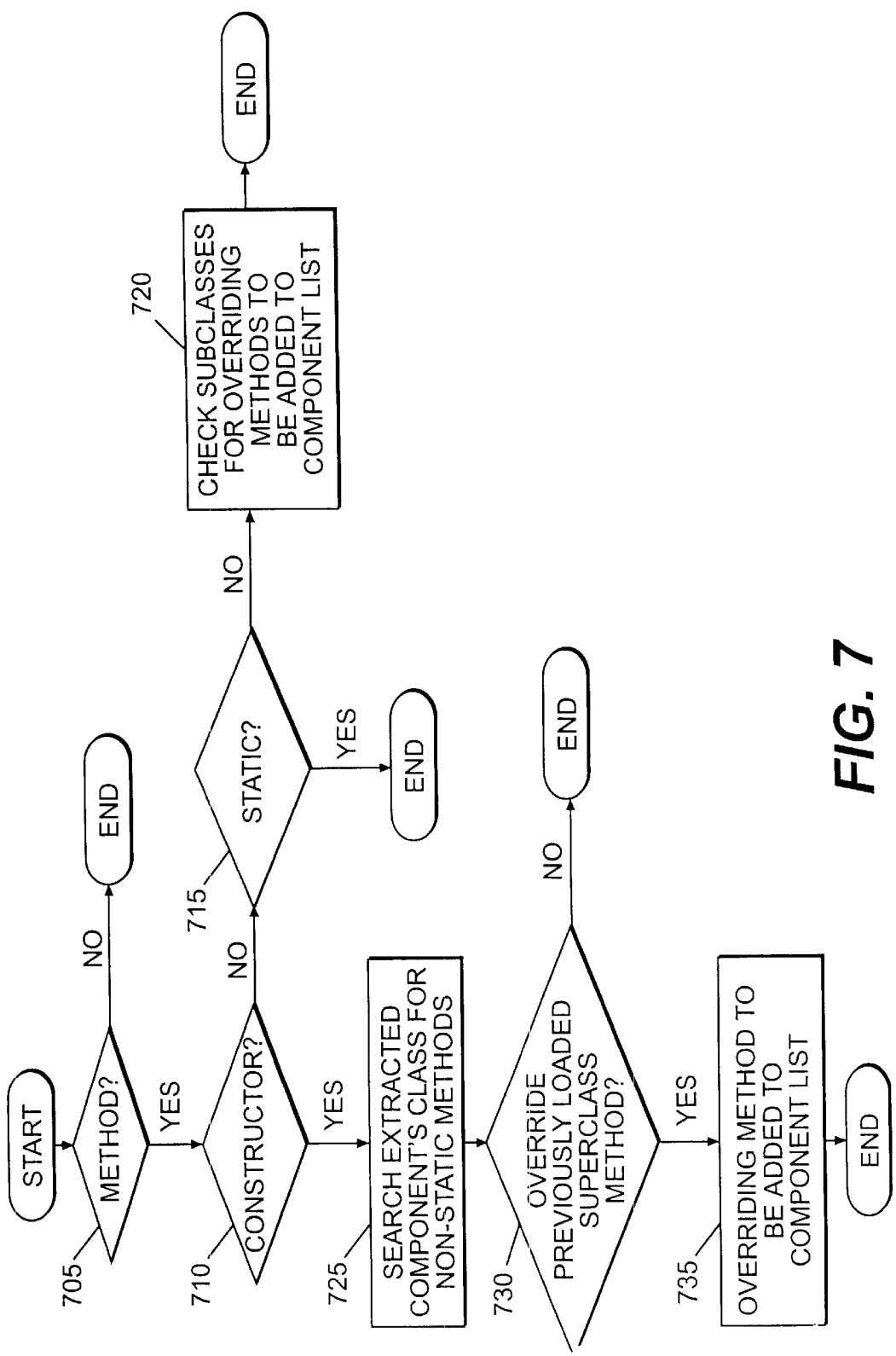
FIG. 7 is a flow diagram of steps performed to add necessary methods, in an embodiment consistent with the present invention.

FIG. 7 is a flow diagram, consistent with the present invention, of steps performed by linkage editor 487 to check for overridden methods. Overriding is a technique for replacing a superclass's implementation of a method with that of a subclass. To check for overridden methods, linkage editor 487 first determines whether the extracted component is a method or data (step 705). Because the issue of overriding only concerns components that are methods, nothing need be done if the extracted component is data. On the other hand, if the extracted component is a method, linkage editor 487 determines whether the method is a constructor (i.e., whether it creates an object) (step 710).

If the extracted method is not a constructor, linkage editor 487 next determines whether the method is a static one (step 715). If it is static, nothing need be done because static methods cannot be overridden. If the method is not static, linkage editor 487 checks to see if the extracted method has been overridden. Specifically, linkage editor 487 searches all subclasses (of the extracted method's class) that already have a constructor loaded. If any of those subclasses have a method that overrides the extracted method, then that overriding method must be added to the component list (step 720).

If the extracted method is a constructor, linkage editor 487 searches the extracted method's class to determine if it contains any methods that override previously loaded methods. Specifically, linkage editor 487 searches the class containing the extracted component for nonstatic methods (static methods cannot override) (step 725). If any of those non-static methods override a method previously loaded from a superclass of the extracted component's class (step 730), then the overriding non-static method must be added to the component list (step 735). The approach described above applies not only to methods that are overridden, but also to methods that are parts of a Java interface specification.

H. Client Procedure

Figure 8:
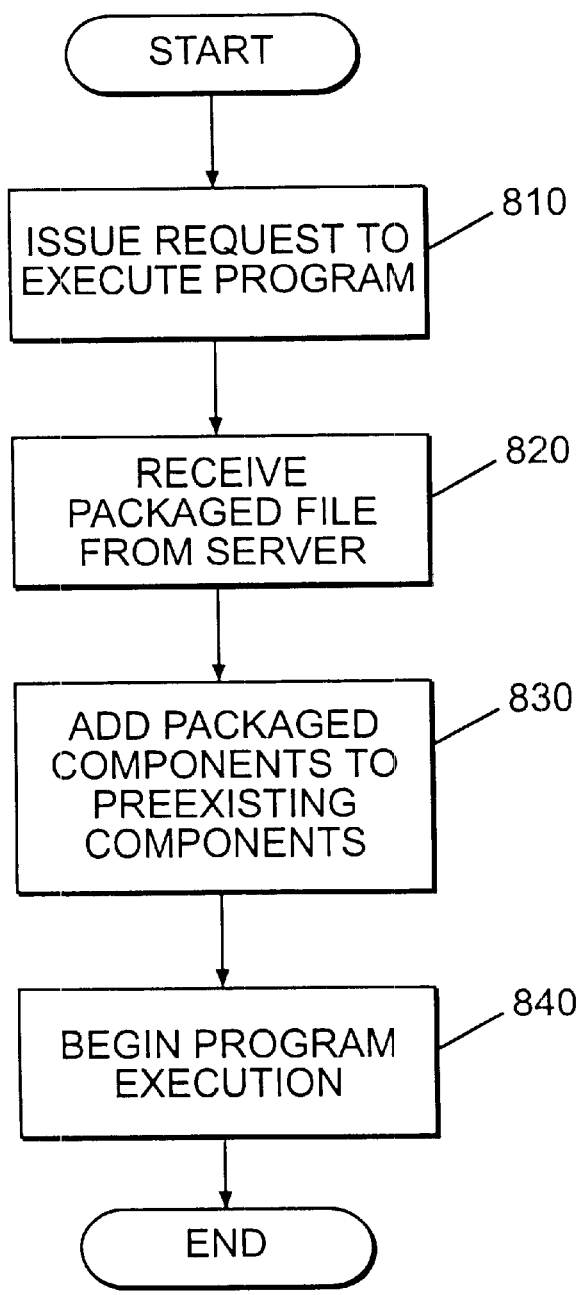
FIG. 8 is a flow diagram of the steps performed by the client to execute a program, in an embodiment consistent with the present invention.

FIG. 8 is a flow diagram of the steps performed by the client to execute a program consistent with the present invention. First, client 100 issues a request to begin execution of the specified program (step 810). In response to this request, client 100 receives from server 160 a packaged file (i.e., the output file mentioned above) containing all necessary components for program execution (step 820). Client 100 adds the provided components to those already existing on client 100 (step 830). Specifically, client 100 reads the information from the packaged file, builds the internal data structures, and links these data structures into its list of class names. Client 100 then begins executing the program (step 840), resolving class names as needed. The process then ends.

I. Conclusion

The system described above packages together only the components necessary for program execution and delivers them to the client before execution begins. The foregoing description of an implementation of the invention has been presented for purposes of illustration and description. For example, the described implementation includes software but the present invention may be implemented as a combination of hardware and software or in hardware alone. Modifications and variations are possible in light of the above teachings or may be acquired from practicing the invention.

Although systems and methods consistent with the present invention are described as operating in the exemplary distributed system and the Java programming environment, one skilled in the art will appreciate that the present invention can be practiced in other systems and programming environments. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM. The scope of the invention is defined by the claims and their equivalents.

What is claimed is:

1. A method for packaging program components for execution in a distributed system comprising:

receiving a request to package a program for execution on a client;

determining whether any components are required to execute the program;

generating a notification of classes that are located at the client;

receiving an output file including the required components;

generating a package including the output file; and sending the package to the client.

2. The method of claim 1, wherein determining whether any components are required to execute the program includes:

determining whether any supplemental components are required to execute the program, wherein the output file includes the supplemental components.

3. The method of claim 2, wherein the supplemental components include components that are contained within classes that are located at the client.

4. The method of claim 3, wherein the supplemental components include components that are contained within classes that are located at the client and reference other components not located at the client.

5. The method of claim 1, wherein the request includes the location of classes required for the execution of the program.

6. The method of claim 1, wherein the classes located at the client are indicated in a memory and wherein the step of generating a notification includes:

reading the memory to determine the classes located at the client.

7. The method of claim 1 wherein the program is a collection of classes and components.

8. The method of claim 1, wherein the output file includes overriding methods.

9. A method for packaging program components for execution in a distributed system comprising:

receiving instructions from an interface task, the instructions including the location of classes required for the execution of a program on a client computer;

using the instructions to locate a class containing a component required to execute the program;

extracting the component from the located class;

inserting the extracted component into an output file;

determining whether the extracted component references another component;

extracting the referenced another component;

adding the extracted referenced another component to the output file; and sending the output file to the interface task.

10. The method of claim 9, wherein determining whether the extracted component references another component includes:

determining whether the extracted component contains dependent components;

adding the dependent components to a component list;

using the instructions to locate the classes containing the dependent components included in the component list; and adding the dependent components to the output file.

11. The method of claim 9, wherein extracting the referenced another component includes:

determining that the extracted referenced another component is a constructor component;

locating the extracted referenced another component's class;

locating an overriding method within the extracted referenced another component's class; and adding the overriding method to the output file.

12. The method of claim 11, wherein the overriding method overrides a method previously loaded from a superclass of the extracted referenced another component's class.

13. The method of claim 9, wherein extracting the referenced another component includes:

determining that the extracted referenced another component is not a constructor component;

locating the extracted referenced another component's class;

searching a subclass of the extracted referenced another component's class, wherein the subclass includes a loaded constructor component;

determining whether the subclass includes a method that overrides the extracted referenced another component; and adding the method that overrides the extracted referenced another component to the output file.

14. The method of claim 9, wherein extracting the component includes:

determining that the extracted component is a constructor component;

locating the extracted component's class;

locating an overriding method within the extracted component's class; and adding the overriding method to the output file.

15. The method of claim 14, wherein the overriding method overrides a method previously loaded from a superclass of the extracted component's class.

16. The method of claim 9, wherein extracting the referenced component includes:

determining that the extracted component is not a constructor component;

locating the extracted component's class;

searching a subclass of the extracted method's class, wherein the subclass includes a loaded constructor component;

determining whether the subclass includes a method that overrides the extracted component; and adding the method that overrides the extracted component to the output file.

17. A method for packaging program components for execution in a distributed system comprising:

extracting a component from a stored class, wherein the extracted component is a required component for the execution of a program at a client;

determining that the extracted component is a constructor component;

locating the extracted component's class;

locating an overriding method within the extracted component's class; and inserting the overriding method into an output file, wherein the output file includes a plurality of required components needed to execute the program that are not located at the client.

18. A method for packaging program components for execution in a distributed system comprising:

extracting a component from a stored class, wherein the extracted component is a required component for the execution of a program at a client;

determining that the extracted component is not a constructor component;

locating the extracted component's class;

searching a subclass of the extracted method's class, wherein the subclass includes a loaded constructor component;

determining whether the subclass includes a method that overrides the extracted component; and adding the method that overrides the extracted component to an output file, wherein the output file includes a plurality of required components needed to execute the program that are not located at the client.

19. A method for executing a retrieved program in a distributed system, comprising:

sending a request to execute a program to a server;

receiving from the server a package of components required to execute the program;

extracting the components from the package;

combining the extracted components with already existing components; and using the extracted and existing components to execute the program.

20. The method of claim 19, wherein the components included in the package include overriding methods.

21. The method of claim 19, wherein the components included in the package include at least a first component, and wherein the package includes all components referenced by the first component.

22. The method of claim 21, wherein the components referenced by the first component are not identical with the existing components.

23. The method of claim 21, wherein the components referenced by the first component include at least one component identical to one of the existing components.

24. A method for packaging program components for execution in a distributed system, the method performed by a client computer comprising the steps of:

sending a request to a server to execute a program, the program including references to components;

receiving a package from the server, the package including the program and extracted components;

adding the extracted components to preexisting components located at the client computer; and executing the program.

25. A method for packaging program components for execution in a distributed system, comprising:

sending a request to execute a program from a client to a server, the program including references to components;

creating, at the server, a package that includes the program and components required for execution of the program;

sending the package to the client; and using the components in the package to execute the program.

* * * * *